(12) United States Patent
Engelhardt et al.

(10) Patent No.: US 6,444,971 B1
(45) Date of Patent: Sep. 3, 2002

(54) METHOD AND SYSTEM FOR COMPENSATING INTENSITY FLUCTUATIONS OF AN ILLUMINATION SYSTEM IN A CONFOCAL MICROSCOPE

(75) Inventors: Johann Engelhardt, Bad Schonborn; Bernd Widzgowski, Dossenheim, both of (DE)

(73) Assignee: Leica Microsystems Heidelberg GmbH, Heidelberg (DE)

( * ) Notice: Subject to any disclaimer, the term of this patent is extended or adjusted under 35 U.S.C. 154(b) by 0 days.

(21) Appl. No.: 09/476,649

(22) Filed: Dec. 31, 1999

(51) Int. Cl.$^7$ ............................................... G01N 21/00
(52) U.S. Cl. ........................ 250/214 DC; 250/234; 356/445
(58) Field of Search ..................... 250/201.3, 205, 250/216, 214 L, 214 DC, 234; 359/368, 385; 356/445, 448

(56) References Cited

U.S. PATENT DOCUMENTS 4,859,062 A * 8/1989 Thurn et al. ................. 356/371
4,921,351 A * 5/1990 Kohigashi et al. ........... 356/323
5,260,561 A * 11/1993 Dhurjaty ..................... 250/214 C
6,037,579 A * 3/2000 Chan et al. .................. 250/216
6,304,328 B1 * 10/2001 Longtin ....................... 356/445

* cited by examiner

*Primary Examiner*—Kevin Pyo
*Assistant Examiner*—Seung Sohn
(74) *Attorney, Agent, or Firm*—Maria M. Eliseeva, Esq.; Brown Rudnick Berlack Israels, LLP

(57) ABSTRACT

A method and system for compensating intensity fluctuations of an illumination system in a confocal microscope comprise a first and a second analog-to-digital converters for digitizing a first electrical signal corresponding to the light reflected from a specimen, and for digitizing a second electrical signal corresponding to an illumination reference, respectively. The digitized signals are sent to a first and a second look up tables carrying out a log conversion of the first and second electrical signals, respectively. Also provided is a calculator for correcting the first electrical signal for intensity fluctuations of the second electrical signal. The corrected electrical signal is sent to a third look up table for converting the corrected electric signal. The conversion is done by exponentiation of the corrected electrical signal.

14 Claims, 2 Drawing Sheets

METHOD AND SYSTEM FOR COMPENSATING INTENSITY FLUCTUATIONS OF AN ILLUMINATION SYSTEM IN A CONFOCAL MICROSCOPE

FIELD OF THE INVENTION

This invention relates to a method and system compensating for intensity fluctuations of an illumination system in a confocal microscope. More particularly, the invention relates to a method and system capable of carrying out compensation for intensity fluctuations of light in real time.

BACKGROUND OF THE INVENTION

In confocal microscopy a specimen is scanned with a focused laser beam. The focus of the laser beam is moved in a section plane of a specimen by two scan mirrors tilting around their respective axes, which axes are perpendicular to each other. The first scan mirror diverts the laser light in the x-direction and the second scan mirror diverts the laser light in the y-direction while the intensity of the reflected or the fluorescent light is measured for each scanning point. Each measured intensity value relates to an x, y and z-position of the specimen, therefore, providing a user with a three-dimensional image of the specimen.

An article in the Journal of Microscopy, Vol. 117, Pt 2, November 1979, pp 233–242 by G. J. Brakenhoff, entitled "Imaging Modes in Confocal Scanning Light Microscopy", discloses a method for eliminating short term fluctuations of the illumination intensity by using a beam splitter to separate an illumination beam and a reference beam. In that method the ratio between the illumination beam and the reference beam is used to eliminate intensity fluctuations and create a better quality image.

An example for a confocal microscope is disclosed in U.S. Pat. No. 5,804,813 "Differential confocal microscopy" to J. D. Wang et al. That Patent describes a He—Ne laser as the light source, and a microscope objective lens as a focusing device. The light signal reflected from the surface of a specimen travels through a beam splitter and is almost completely reflected at the surface to travel to an optical detector which can use photodiodes, avalanche photodiodes, photo multipliers, charge coupled devices (CCDs), or fluorescent screens. The signal is detected by the optical detector and then amplified by a signal amplifier. The amplified signal is recorded by an analog-to-digital converter and then stored in a computer. The computer generates a three-dimensional image by using the intensity of the signal corresponding to the respective coordinates of the specimen. Before the measurement is performed, it is necessary to use the same sample to calibrate the relationship between the variation of signal intensity and the height of the sample.

Registration and processing of a position signal is normally done with analog circuits, computers or digital signal processors (DSP). There are certain disadvantages of performing signal processing with analog circuits. For example, signal processing can only be carried out with the help of a correction function implemented in an analog circuit. Compensation for intensity fluctuations is done in the analog circuit by the division of the signal from the specimen by the reference signal. If a modified or more complex correction function is to be used, a new design of an analog circuit may be necessary. Such more complex correction function can be, for example, the weighing of the signals to consider offsets or leveling the nonlinearity of the detectors. Changes of the correction mechanism, such as for example, changes of a scan rate, require a lot of effort. Moreover, the accuracy of analog circuits with respect to mathematical operations reaches its limit at high scan rates. Pixel rates greater than 1 MHz at a 12-bit accuracy can be achieved only with enormous effort.

SUMMARY OF THE INVENTION

It is an object of the present invention to provide a method for correcting intensity fluctuations of the illumination system of a confocal microscope in real time. Furthermore, it is also an object of the present invention to make the processing of the electric signals possible at high scanning rates. These objects are achieved by a method comprising the steps:

digitizing a first electric signal representing the light reflected from a specimen, and digitizing a second signal representing an illumination reference;

feeding the first and second electric signals to a first and second look up tables, respectively;

correcting the first electric signal for intensity fluctuations of the second electric signal; and providing the corrected electric signal to a third look up table.

It is also an object of the present invention to provide a system capable of correcting intensity fluctuations of an illumination system in a confocal microscope. The system allows processing of electric signals at high scanning rates in real time. Additionally, it is an object of the present invention to allow a user to modify the existing processing algorithms easily.

These objects are accomplished with a system, comprising:

a first and a second analog-to-digital converters for digitizing a first electric signal corresponding to the light reflected from a specimen, and digitizing a second signal corresponding to an illumination reference, respectively;

a first and a second look up tables for converting the first and second electric signals, respectively;

a calculator for correcting the first electric signal for intensity fluctuations of the second electric signal to provide a corrected signal;

a third look up table for converting the corrected electric signal.

An advantage of the inventive method and system is that the position signal of the focused scanning beam and of the signals from the detectors (the scanning beam and reference beam) are digitized at a very early stage. Processing of the data is done mainly in a digital form with the use of a programmable control and processing unit which is implemented in a programmable digital circuit, such as, for example, FPGA (Field Programmable Gate Array). Correction parameters can be used online, making the subsequent image processing much easier or unnecessary at all. The accuracy of the device depends solely on the accuracy of the detectors and of the analog-to-digital converters. Analog-to-digital converters with a large processing bandwidth are available at reasonable costs. Modification of the scan device and scan elements (for example, by using new detectors) and also an increase in accuracy (for example, from 12 Bit to 16 Bit sampling) do not require changing or modifying the mechanical parts of the microscope. The present invention makes it possible to load new or upgrade existing filter modules or algorithms during data processing. The dynamic pixel accumulation during a measurement allows the system to operate in a wide dynamic range of scanning rates from a few Hz to up to 250 MHz.

A further advantage of the system is its ability to compensate intensity fluctuations in real time, which repeats the predetermined process steps with the accuracy up to nanoseconds. The system of the present invention satisfies the requirements of flexibility and real time data processing, because, for example, there is no need to buffer data, since a computer controlled data recording is not used. The real time processing ability of the inventive system provides a loss free and flexible data collection with the highest possible scan rates. Computers are controlled by interrupts, so a running process has to be ended before further data processing can go on. The present invention has the ability of a high flexibility with respect to data processing changes and real time processing of the data.

BRIEF DESCRIPTION OF THE DRAWINGS

The subject matter of the invention is described with reference to the embodiments shown in the following drawings.

DETAILED DESCRIPTION OF THE INVENTION

Figure 1:
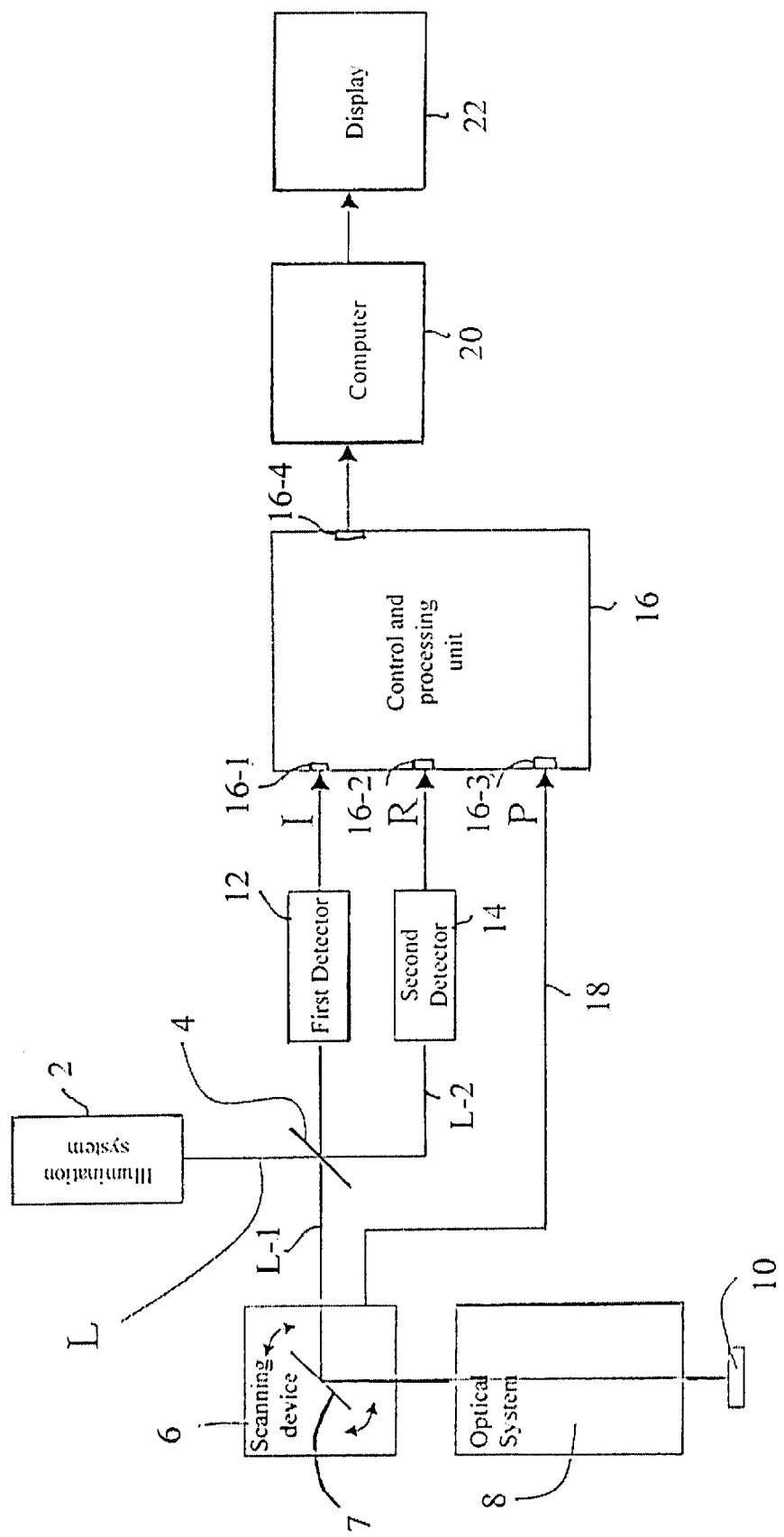
FIG. 1 is a schematic illustration of a confocal microscope and a system for providing three dimensional images.

FIG. 1 shows a schematic illustration of a confocal microscope and a system for obtaining three dimensional specimen images. An illumination system 2 generates a light beam L. A beam splitter 4 divides the incident light beam L into a first path $L_1$ and into a second path $L_2$. The light from the illumination system is directed to a scanning device 6 along the first path $L_1$. Scanning device 6 comprises a scanning mirror system 7 moveable in such a way that the light propagating along the first path $L_1$ is scanned across a specimen 10. The light propagating along the first path $L_1$ passes through an optical system 8 before reaching specimen 10. The light reflected from the specimen travels along the first path $L_1$ back to beam splitter 4 and then to a first detector 12 positioned to receive the light reflected from specimen 10. First detector 12 converts that light into a first electrical signal I, wherein the first signal I is proportional to the intensity of the light reflected from the specimen. A second detector 14 receives the light traveling from illumination system 2 along the second path $L_2$. Similarly to the first detector 12, the second detector 14 converts the detected light into a second electrical signal R. The second signal R is proportional to the intensity of the detected light serving as an illumination reference. A control and processing unit 16 is provided with a first, a second and a third input ports $16_1$, $16_2$ and $16_3$. The first electrical signal I is fed to the first input port $16_1$ and the second electrical signal R is fed to the second input port $16_2$. The third input port $16_3$ receives a position signal P, generated in scanning device 6, via an electrical connection 18. The disclosed embodiment describes three different analog signals I, R and P fed to control and processing unit 16. It is contemplated by the present invention that more than three different signals can be fed to be processed in control and processing unit 16 through one or more multiplexers (not shown in FIG. 1) and processed in unit 16.

Control and processing unit 16 converts the incoming analog signals (the first electrical signal I, the second electrical signal R, and the position signal P), which signals may be distorted and disrupted, into corrected digital signals. Via an exit port 164 the digital signals are sent to a computer 20 which may carry out some image processing. A conventional display 22 is used to show the image of specimen 10 to a user of the system.

Figure 2:
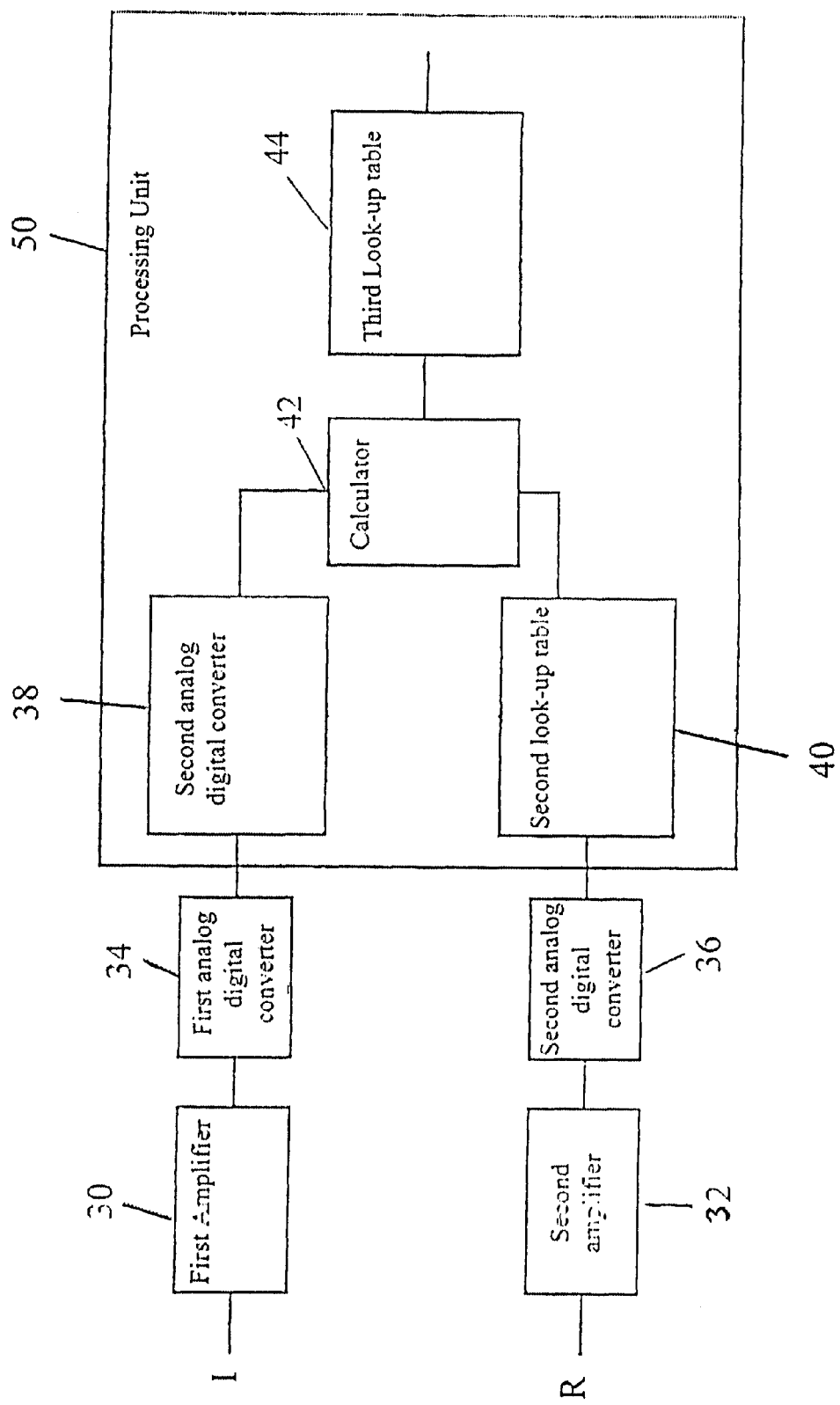
FIG. 2 is an embodiment of a compensation unit.

FIG. 2 illustrates an embodiment of a fluctuation compensation unit of illumination system 2. The first electrical signal I is proportional to the intensity of the light reflected from the specimen. The second electrical signal R is proportional to the light from illumination system 2. The first electrical signal I is sent to a first amplifier 30 and from the first amplifier 30 the amplified signal is sent to a fast first analog-to-digital converter 34. The second electrical signal R is processed in a similar way. The second electric signal R is sent to a second amplifier 32 and from second amplifier 32 the amplified signal is sent to a fast second analog digital converter 36. After the conversion, the first electrical signals I and the second electrical signal R are in a digital form. A processing unit 50 is used to process the digitized first and second electrical signals I and R, utilizing one or more FPGA units (Field Programmable Gate Array). In the illustrated embodiment the FPGA comprises a first and a second look up tables 38 and 40, a calculator 42 and a third look up table 44.

The first electrical signal I is sent to the first look-up table 38 and the second electric signal R is sent to the second look up table 40. Both look up tables 38 and 40 carry out a log conversion of the data. After being log converted in look-up tables 38 and 40, the data are fed to calculator 42 where the log of the first electrical signal I is subtracted from the log of the second electrical signal R. The result of the subtraction is fed to the third look-up table 44 carrying out exponentiation of the result of the subtraction. The result from the third look up table is the quotient of the two electrical signals I and R, which result is now ready for further processing.

The present invention has been described with respect to an illustrated embodiment. It is obvious to a person of average skill in the art that the described data processing can utilize other mathematical functions. Furthermore, it is the property of the FPGAs that the utilized mathematical function can be modified even during data processing. Plus, the accuracy of the data processing can be increased or changed without modifying the electronic circuit itself. Therefore, while the invention has been described in detail with particular reference to the illustrated embodiments thereof, it should be understood that variations and modifications can be practiced without departing from the spirit and scope of the present invention.

What is claimed is:

1. A method for compensating intensity fluctuations of an illumination system in a confocal microscope having a scanning device and capable of generating a three-dimensional image of a specimen, the method comprising:

providing a first electrical signal corresponding to light reflected from the specimen, providing a second electrical signal corresponding to an illumination reference, and providing a third electrical signal corresponding to a position signal, the position signal being generated by the scanning device;

converting the first electrical signal into a first digitized signal, converting the second electrical signal into a second digitized signal, and converting the third electrical signal into a third digitized signal;

compensating intensity fluctuations by processing the first and the second digitized signals in a fluctuation compensation unit to obtain a quotient of the second digitized signal over the first digitized signal; and sending the quotient and the third digitized signal to a computer capable of utilizing the quotient and the third digitized signal for displaying the three-dimensional image of the specimen.

2. The method of claim 1, wherein processing the first and the second digitized signals in a fluctuation compensation unit comprises feeding the first digitized signal to a first look-up table to carry out a conversion of the first digitized signal and feeding the second digitized signal to a second look-up table to carry out a conversion of the second digitized signal.

3. The method of claim 2, further comprising feeding results of the conversions of the first and the second digitized signals to a third look-up table to obtain a quotient of the second digitized signal over the first digitized signal.

4. The method of claim 2, wherein the first and the second look-up tables serve to perform a log conversion of the first and the second digitized signals, respectively.

5. The method of claim 3, wherein the third look-up table serves to perform exponentiation of the difference between a log of the second digitized signal and the first digitized signal.

6. The method of claim 1, further comprising amplifying the first, second and third electrical signals prior to converting them into the first, second and third digitized signals.

7. The method of claim 1, wherein the fluctuation compensation unit comprises field programmable gate arrays.

8. A system for compensating intensity fluctuations in a confocal microscope, the system comprising:
   a first detector for detecting light reflected from a specimen and converting it into a first electrical signal;
   a second detector for detecting light serving as an illumination reference and converting it into a second electrical signal;
   a scanning device for scanning a specimen and generating a third electrical signal corresponding to a position signal of the specimen;
   a control and processing unit for receiving and digitizing the first, the second and the third electrical signals and for outputting a quotient of the second digitized signal over the first digitized signal and the third digitized signal; and
   a fluctuation compensation unit for processing the first and the second digitized signals to obtain the quotient of the second digitized signal over the first digitized signal.

9. The system of claim 8, wherein the fluctuation compensation unit comprises a first look-up table for performing a log conversion of the first digitized signal and a second look-up table for performing a log conversion of the second digitized signal.

10. The system of claim 8, wherein the fluctuation compensation unit comprises a third look-up table for performing exponentiation of the difference between a log of the second digitized signal and the first digitized signal.

11. The system of claim 8, further comprising a first amplifier and a second amplifier for digitizing the first and the second electrical signals before digitizing the first and the second electrical signals in the control and processing unit.

12. The system of claim 8, further comprising a computer capable of utilizing the quotient and the third digitized signal to display a three-dimensional image of the specimen.

13. The system of claim 8, further comprising an illumination system.

14. The system of claim 8, wherein the fluctuation compensation unit comprises field programmable gate arrays.

* * * * *